March 5, 1946.  E. A. ROCKWELL  2,395,941
DOUBLE CHECK UNLOADING VALVE
Filed Dec. 24, 1943
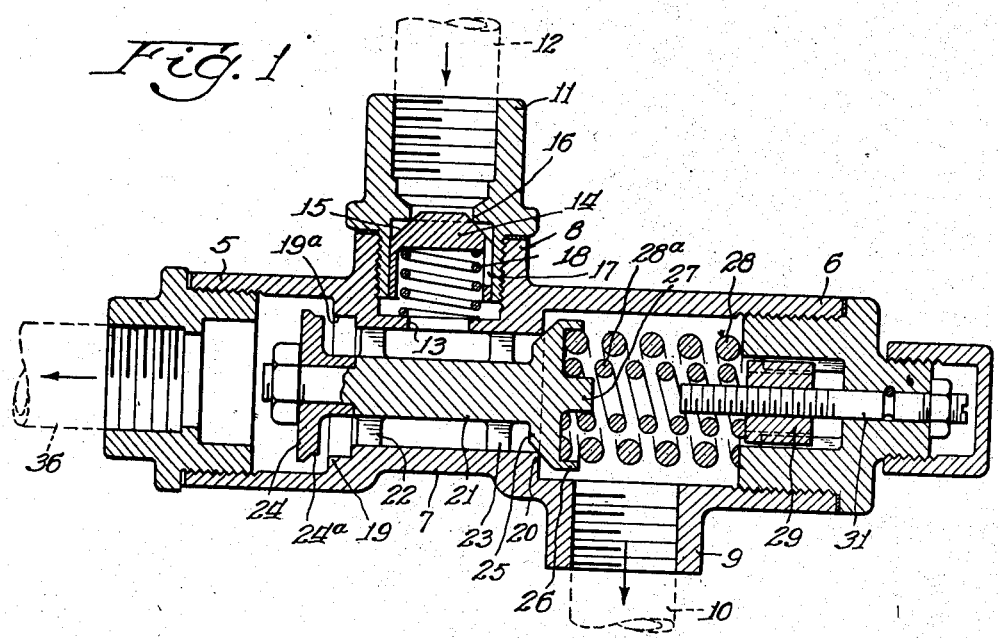
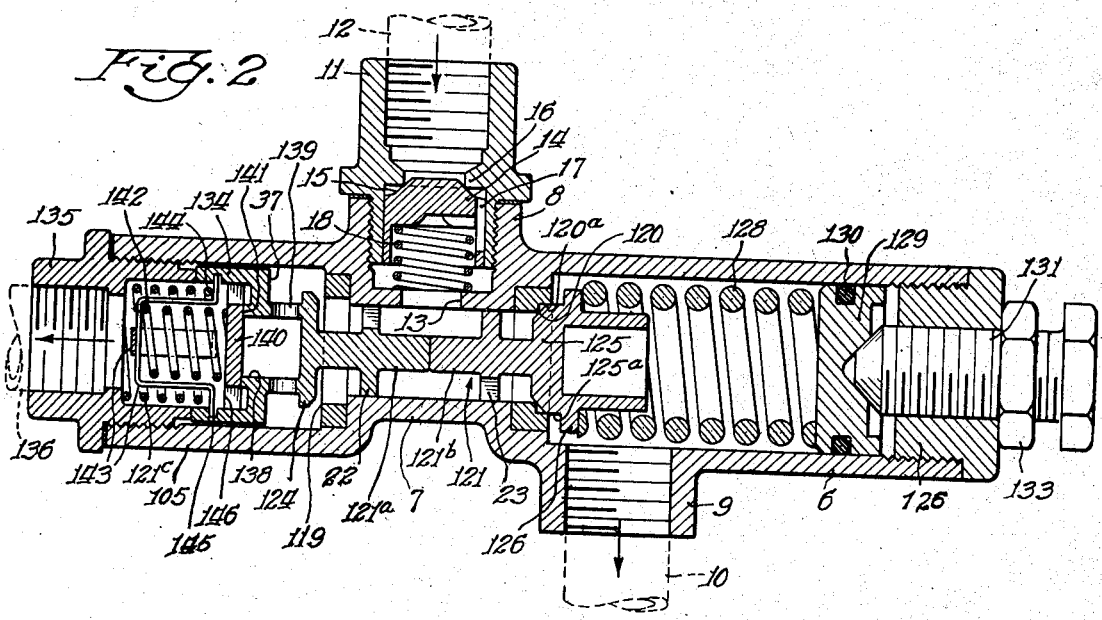
Inventor:
Edward A. Rockwell
By: Edward C. Fitzbaugh
Atty.

Patented Mar. 5, 1946

2,395,941

UNITED STATES PATENT OFFICE 2,395,941

DOUBLE CHECK UNLOADING VALVE

Edward A. Rockwell, Cleveland, Ohio, assignor to Pesco Products Co., Cleveland, Ohio, a corporation of Ohio Application December 24, 1943, Serial No. 515,603

3 Claims. (Cl. 137—153)

The present invention relates to pressure regulating valve arrangements and more particularly to the type known as unloading valves adapted to be interposed between a constantly operating pump and an accumulating system for maintaining pressures therein between selected limits.

It is an object of this invention to simplify the construction of an unloading valve such as contemplated herein, and to improve the efficiency and operation of such valve.

One of the principal difficulties with regulating valve arrangements of the so-called unloading type has been a lack of sharp or sensitive response to the occurrence of the maximum and minimum values of pressure for which the same is set to operate. Due to friction and lack of means for insuring positive operation prior valves either do not respond, or when operation of the relief valve portion is initiated the same merely partially opens and vacillates in an undecided manner between open and closed positions producing a condition commonly known as "chattering."

It is an object of this invention to provide an unloading valve arrangement that is free from friction producing seals and which has positively acting means for effecting the complete movement thereof once the same has been initiated.

It is a more particular object to provide an improved pressure regulating valve arrangement incorporating a pair of valves which are in effect connected to reciprocate together into and out of engagement with their respective seats alternately and forming a double check valve assembly, one of said valves cooperating with a first valve seat or port for controlling the delivery of pressure fluid to a first pressure zone which may, for example, be an accumulative system in which it is desired to maintain pressure between selected maximum and minimum values, and the other valve cooperating with a second valve seat or port for controlling alternately the delivery to a second pressure zone which may, for example, be for relieving the pump to the return line when the selected maximum pressure has been reached or for delivering pressure to another point of consumption.

It is a further object to so arrange the effective areas of said valves that it requires a predetermined greater pressure to open the relief control valve than to maintain the pressure delivery valve closed whereby to provide a predetermined differential in the operating pressures.

Additional objects, aims and advantages of the present invention will be apparent to persons skilled in the art after the construction and operation of this double check unloader valve is understood from the within description.

It is preferred to accomplish the numerous objects and to practice this invention substantially as hereinafter fully described and as more particularly pointed out in the appended claims, references being made to the accompanying drawing that forms a part of this specification, wherein:

Fig. 1 is a sectional view taken axially through a double check unloader valve arrangement illustrating one embodiment of my invention; and Fig. 2 is a view similar to Fig. 1 showing an alternative embodiment of my invention.

The drawing is to be understood as being more or less of a schematic character for the purpose of disclosing typical or preferred forms of the improvements contemplated herein, and in said drawing the same reference characters identify like parts wherever these parts appear in the different views.

Referring in further detail to Fig. 1 of the drawing, this structure embodies an elongate housing consisting of cylinders 5 and 6 connected by a reduced neck 7 that is provided with a radial inlet stub 8, and alongside this neck there is a radial outlet stub 9, that projects in a direction opposite the inlet stub 7. The outlet stub 9 is internally threaded to receive the fluid return pipe 10, and the inlet stub 8 is internally threaded for mounting a coupling 11 that is connected to the feed pipe 12 leading from a continuously operating pump (not shown).

A lateral port 13 in the neck portion 7 at the bottom of the inlet stub 8 provides communication with the interior of the housing, and the passage of fluid through said port is controlled by a one-way, outward pressure check valve 14 that permits the pressure fluid from the pump to pass through the inlet port 13 but prevents a reverse flow of the fluid in a direction toward the pump. The upper portion 15 of valve 14 is conical in shape and is adapted to contact a seat 16 at the inner terminal of the coupling 11. Valve body 14 is cup-shaped and includes passageways 17 permitting flow of the fluid past the valve when the latter is unseated. This check valve 14 is urged toward its seat by a coil spring 18 that has its lower end resting upon the wall of the neck 7 around the inlet port 13. The pressure of the fluid opens this valve against the spring pressure and permits flow of the fluid through the port 13 and into the housing, and said valve will close immediately there is a tendency of the fluid to reverse its direction of flow.

At the inner end of housing member 5 there is a valve seat 19 arranged to communicate with an accumulating system (not shown) through conduit 36. At the inner end of housing member 6 there is another valve seat 20 arranged to communicate with the return through conduit 10 for effecting the unloading of the pump. The former seat 19 preferably has a larger area than the latter for an important purpose to be described. Operating in the neck 7 of the housing there is a reciprocal valve stem 21 that is provided with relatively wide splines 22 and 23 that provide guiding means for longitudinal reciprocal movement in the neck 7 and also to permit the pressure fluid to flow therepast.

A chamfered check valve 24 is disposed on one terminal of stem 21 for cooperation with the valve seat 19 while the other terminal of stem 21 carries a relief return valve 25 for alternate cooperation with valve seat 20. The outer face of relief return valve 25 is provided with an annular flange 26 and a central boss 27 extending axially therefrom to receive the adjacent inner end of coil spring 28. If desired, a second spiral spring 28a may also be employed, as shown in Fig. 1 for effecting a refined adjustment of spring loading. A follower 29 engages the outer end of spring 28a and is adapted to be adjusted to increase or diminish the loading thereof by means of a bolt 31. The function of these springs is to urge the relief valve 25 inwardly in the seating direction thereof with a selected force. This force is made sufficient to overcome pressures on the inner face of valve 25 up to the selected maximum delivery pressure. When the delivery pressure exceeds the selected value for which the springs are set, such pressure will unseat relief return valve 25 to permit the fluid to flow through outlet stub 9 to the return pipe 10. As valve 25 is opened valve 24 is moved toward closed position, since the two valves are connected together against relative movement. It will be noted that as this movement of valve 24 takes place masking piston-like surface 24a moves into cooperation with masking cylinder-like surface 19a reducing or throttling the flow between valve 24 and seat 19. The opening of valve 25 thus produces a momentary pressure within neck portion 7 below that on the accumulator side of valve 24 with the result that the differential pressure acting on the accumulator side of valve 24 becomes effective to move the same completely into engagement with seat 19. Since the cross-sectional area of valve seat 19 is made greater than that of valve seat 20 valve 24 will remain closed until the pressure on the accumulator side of valve 24 drops to a value below that at which valve 25 was opened, the exact differential being determined by these relative areas. The lower value of the pressure at which valve 25 will close will, of course, be determined by the loading adjustment of springs 28 and 28a. For example, the areas may be readily given a relative size such as to cause operation in response to a differential of 100 lbs. per square inch, cutting the pump in at 900 lbs. per square inch and unloading the same at 1,000 lbs. per square inch.

Turning to the modified form of structure shown in Fig. 2, the pressure delivery check valve 124 is provided with a hollow cylindrical piston 134 that is given a sufficiently loose fit in the bore of tubular housing member 105 to permit a limited metered flow of fluid between said piston and the surrounding wall. This eliminates any friction that would result from a seal. At its outer end the piston 134 normally abuts the inner end of flanged coupling 135 threaded into the outer end of a housing member 105 and is connected with the pipe 136 leading to the accumulator (not shown).

A cylindrical hollow throat 138, having lateral apertures 139, connects the transverse piston wall 37 to pressure delivery check valve 124, and said apertures permit flow of fluid into the interior of the throat 138. Within piston 134 there is a disc-shaped auxiliary check valve 140 that seats on an annular flange 141 surrounding the opening into the throat 138 and said valve 140 is urged toward its seat by a coil spring 142 that is mounted in an open cage or retainer in the form of metal strips 143 having lateral ends 144 that are snapped into an annular groove 145 in the cylindrical wall of the piston 134. The auxiliary check valve 140 has serrations or splines 146 upon its peripheral edge effective to guide the same and when unseated permit flow of fluid past the valve to the accumulator.

A slightly different shaped relief return valve 125 is shown and a slightly modified threaded adjusting assembly is shown including a single spring 128, an engaging piston 129, seal 130, closure plug 132 and lock nut 133. Valve seat 120 is provided with a cylinder-like masking surface 120a cooperating with piston-like masking surface 125a to further insure positive operation as will appear. The stem assembly 121 for correlating the alternating reciprocal movement of valves 124 and 125, is shown as being composed of two parts, 121a and 121b with the inner terminals in abutting contact. These terminals are normally maintained in this connected or abutting relation by a followup coil compression spring 121C acting in opposition to stronger spring 128 for the purpose of causing valve 124 to follow valve 125, and this construction having the advantage among others of facilitating assembly. It will be apparent that in certain installations, it may be desirable to fasten valves 124 and 125 together and eliminate spring 121C in a manner the equivalent of that shown in Fig. 1.

Turning now to the operation of the modified arrangement shown in Fig. 2, it will be noted that the piston 134 and associated auxiliary check valve 140 form the principal distinction over the modification of Fig. 1, functioning to insure complete movement once the same has been initiated. With the parts in the position shown, pressure is being delivered through inlet 12 past check valve 14, pressure delivery check valve 124, auxiliary check valve 140 and outlet 136 to the accumulator. This condition of the parts will continue to prevail until the pressure delivered rises to a predetermined maximum value for which spring 128 is set, which, for example, may be 1,000 lbs. per square inch, whereupon the pressure acting on the face of relief return valve 125 becomes effective to move valve 125 against spring 128. When valve 125 is unseated and masking surfaces 120a and 125a are moved out of opposed relation there occurs a resulting momentary pressure drop in the reduced neck portion 7 of the housing below the pressure on the accumulator side of auxiliary check valve 140 causing the latter to close under the added influence of spring 142. The moment valve 140 is closed then the pressure differential between the opposite sides of piston 134 is applied thereto forcing the piston and associated valves to the right in Fig. 2, completing the opening of relief return valve 125 and the closing of pressure delivery valve 124 on its seat 119. It is important to note that during the above operation there occurs a limited flow from the accumulator past piston 134. While the tolerance between piston 134 and the surrounding wall is made sufficient to eliminate the friction that would result from a sealed relation, the same nevertheless is still small enough to maintain piston 134 effective to positively move the valve assembly to the right in Fig. 2 against the action of spring 128, moving relief return valve 125 completely free of its seat and moving pressure delivery valve 124 into engagement with its seat 119. While there is a small metered flow around piston 134 during the transition period while the valves are being operated, it is quite important that this flow be completely shut off thereafter. Otherwise, the accumulated pressure would be dissipated thereby and the pump again cut in prematurely.

This unloaded condition with valve 125 in open position will continue until the pressure on the accumulator side of valve 124 falls to a value insufficient to hold valve 124 in engagement with its seat 119 against the force of spring 128 whereupon relief return valve 125 is moved toward its seat 120 again effecting loading of the pump and delivery to the accumulator.

It will be understood that while I have described my invention as applied specifically to the problem of maintaining a range of pressures in an accumulating system and intermittently unloading the pressure generator, the same has broad application to the solution of equivalent problems. For example, one check valve may lead to a first pressure fluid consumer while the other may lead to a second pressure fluid consumer and arranged in such a manner that the first pressure fluid consumer will be supplied with pressure up to a certain value, upon the occurrence of which, delivery will be automatically switched to the second consumer. In the event that the two consuming devices are to be of the pulsating type, it may be desirable to eliminate the return check valve in order to provide for reverse flow in the off direction.

While this invention has been described in detail in its present preferred form or embodiment, it will be apparent to persons skilled in the art, after understanding the improvements, that various changes and modifications may be made therein without departing from the spirit or scope thereof. It is aimed in the appended claims to cover all such changes and modifications.

I claim:

1. In an unloading valve arrangement including a housing having an inlet port, a normal flow outlet, and a relief return port, a one-way check valve controlling said inlet port, axially spaced valve seats in said housing at opposite sides of said inlet port, a double check valve assembly cooperating with said seats comprising a pair of valves, means for maintaining said valves in spaced apart relation, said valves being alternately engageable with said seats, one of said valves controlling flow through said relief return port and the other of said valves controlling flow through said normal flow outlet port, a piston connected to said normal flow valve and located in the flow path therefrom, means defining a cylindrical bore receiving said piston and providing for limited flow between said bore and said piston, a valve-controlled passage through said piston effecting a bar to reverse flow through said piston, and spring means urging said spindle in a direction to seat said relief return valve and to unseat said pressure delivery valve.

2. In an unloading valve arrangement including a housing having an inlet port, a check valve controlling said inlet port, a pressure delivery valve-controlled outlet port, said inlet and outlet ports adapted to effecting a normal continuous flow of fluid from a pump to an accumulator, a piston on the valve of said outlet port having a loose fit in said housing to provide for limited flow of fluid past the same, said piston having an area greater than that of said pressure delivery valve, an auxiliary check valve controlled passage through said piston adapted to be closed upon decrease of pressure of fluid flowing through said housing to the accumulator, a relief return outlet valve in said housing, spindle spacing means interposed between said relief return valve and said pressure delivery valve, said spindle means effecting simultaneous operation of the respective valves to close the one when the other is opened, and adjustable elastic means urging said spindle means in a direction to open said pressure delivery valve for flow to the accumulator, said elastic means being loaded to overcome a predetermined pressure of the flowing fluid to maintain the relief return valve in a seated position.

3. In a pressure fluid valve assembly having a central inlet and two opposed outlets, flanking said inlet valve seats on opposite sides of said inlet communicating with said respective outlets, a double check valve assembly including opposed valves alternately engageable with said respective seats, an adjustable coil compression spring assembly urging said valve assembly in one direction to seat a first one of said valves and open the other to cause delivery of pressure fluid to a first pressure zone or consumer, the delivery of a predetermined value of pressure to said first zone or consumer being effective to open said other valve against the action of said spring for delivering pressure fluid to a second zone or consumer and effective to close said first valve, the valve seat delivering to said first pressure zone or consumer having a larger area than that of said other valve seat whereby upon closure of the associated valve in response to the occurrence of said selected pressure the same is held closed by the pressure from said first zone or consumer until the same has dropped to a predetermined differential of pressure below that which was effective to close the same, and means defining a piston and cylinder in communication with the discharge side of said first valve, said piston having a loose fit within said cylinder and being of a larger area than said valve seat delivering to said first zone, and an auxiliary check valve carried by said piston, the opening of said second named valve being effective to drop the pressure differential across said piston and auxiliary check valve, rendering said piston in turn effective by virtue of the increased relative area thereof to cause positive movement of said first named valve into engagement with its seat.

EDWARD A. ROCKWELL.